United States Patent [19]
Renahy et al.

[11] Patent Number: 5,711,571
[45] Date of Patent: Jan. 27, 1998

[54] OUTER SUPPORT FOR BRACKET AUTOMOBILE SUN VISORS

[75] Inventors: Xavier Renahy, Conflans/Lanterne; Patrick Storck, Echenoz la Meline; Jean Pascal Henneguet, Chemin Variguey; Philippe Vilquin, Luxeuil les Bains, all of France

[73] Assignee: Becker Group Europe GmbH, Wuppertal, Germany

[21] Appl. No.: 190,908

[22] Filed: Feb. 3, 1994

(Under 37 CFR 1.47)

[30] Foreign Application Priority Data

Feb. 3, 1993 [DE] Germany ............ 43 02 919.1

[51] Int. Cl.⁶ .................................................. B60J 3/00
[52] U.S. Cl. ............................... 296/97.13; 248/306
[58] Field of Search .................. 296/97.1, 97.9; 248/294.1, 291.1, 305, 306

[56] References Cited

U.S. PATENT DOCUMENTS

| | | | |
|---|---|---|---|
| 3,020,013 | 2/1962 | Ochin et al. | 248/28 |
| 3,500,483 | 3/1970 | Schohn | 9/1 |
| 3,792,829 | 2/1974 | Fickett | 248/42 |
| 5,074,507 | 12/1991 | Axelson et al. | 248/305 |
| 5,358,299 | 10/1994 | Seto | 296/97.9 |
| 5,411,310 | 5/1995 | Viertel et al. | 296/97.9 |

FOREIGN PATENT DOCUMENTS

| | | |
|---|---|---|
| 0 003 233 A1 | 8/1979 | European Pat. Off. . |
| 0 005 146 A2 | 11/1979 | European Pat. Off. . |
| 28 03 731 A1 | 8/1979 | Germany . |
| 2803731 | 8/1979 | Germany ............ 296/97.9 |
| 30 21 957 A1 | 1/1982 | Germany . |
| 3021957 | 1/1982 | Germany ............ 296/97.9 |
| 35 36 471 A1 | 4/1987 | Germany . |
| 3536471 | 4/1987 | Germany ............ 296/97.9 |
| 43 33 494 A1 | 4/1994 | Germany . |
| 4333494 | 4/1994 | Germany ............ 296/97.9 |
| 5-96953 | 4/1993 | Japan ............ 296/97.9 |
| 193546 | 1/1937 | Switzerland ............ 248/305 |

*Primary Examiner*—David M. Mitchell
*Attorney, Agent, or Firm*—Brinks Hofer Gilson & Lione

[57] ABSTRACT

Outer support bracket for an outer support shaft of an automobile sun visor. The bracket having a mounting member which can be fastened to a surface of the body of the car. An introduction slot is provided between an arm on the mounting member and the mounting member itself for the introduction of the outer support shaft. A locking element which can pivot about an axis spaced from the introduction slot between a locking position and an unlocking position. A locking projection closes the introduction slot in the locking position and releases the outer support shaft in the unlocking position.

10 Claims, 8 Drawing Sheets

OUTER SUPPORT FOR BRACKET AUTOMOBILE SUN VISORS

BACKGROUND OF THE INVENTION

The present invention relates to an outer support bracket for an outer support shaft of an automobile sun visor, the bracket comprising a mounting member, which can be fastened to a surface of the body of the car and which can preferably be developed as a plastic injection molding and also relates to a lockable introduction slot for the outer support shaft which slot is formed between an arm on the mounting member and the mounting member itself.

Such outer support brackets are used for sun visors which are swingably mounted in front of the windshield of automotive vehicles and are also swingable by means of a swivel bearing toward the side window. These outer support brackets receive an outer support shaft, which is on the sun visor and located in a region remote from the swivel bearing, when the sun visor body is located in front of the windshield. For swinging the visor body toward the side window, the outer support shaft is pulled out of the outer support bracket and then the sun visor body is swung around the swivel bearing toward the side window.

In German Patent 28 03 731 of the present applicant, an outer support shaft is held in the undercut introduction slot of a support bracket by at least one spring tongue which can be under spring action. The spring tongue avoids application of too great pressure per unit area on the cover sheet which surrounds the outer support shaft, and thus avoids damage to the cover sheet upon the swinging of the sun visor body up and down, as well as upon the pulling of the sun visor shaft out of the sun visor bracket and upon its reinsertion. The spring action of the spring tongue further assures dependable, rattle proof holding of the outer support shaft in the outer support bracket. The material for the bracket can be a material of a relatively high modulus of elasticity which exhibits only slight differences within the usual temperature range to which visors are exposed, so that this known outer support bracket fully satisfies technical requirements in both cold weather and hot weather.

SUMMARY OF THE INVENTION

Since the demands made on the operation of vehicle equipment parts are constantly increasing and the slightest possible difference between the forces of introduction and of removal at low and high temperatures is desired, the object of the invention is to create an outer support bracket by which these requirements can be satisfied.

A locking element for the outer support shaft is arranged in the mounting member of the outer support bracket. The locking element can be swung between a locking position and an unlocking position. There is a locking projection on the locking element which closes the introduction slot when the locking element is in the locking position at least in one region thereof and which releases the outer support shaft when the locking element is in the unlocking position.

The introduction slot of the outer support bracket of the invention does not have any undercut. Instead, the outer support shaft is held by the locking projection on the swingable locking element in the locking position, while in the unlocking position the locking projection releases the outer support shaft by swinging of the locking element.

The locking element preferably has a recess which is adapted generally to the profile of the outer support shaft and which is open on the side opposite or away from the swivel axis of the locking element. One flank of the locking element defining the recess is defined by the locking projection, which is on the entrance and exit side of the recess, and the other flank is defined by and forms a locking stop. Upon introduction of the outer support shaft into the recess of the locking element which is generally located in the introduction slot, the outer support shaft comes against the locking stop and swings the locking element so that the locking projection now closes the introduction slot in at least one region thereof and holds the outer support shaft rattle free in the outer support bracket.

The outer support shaft can be unlocked by pulling the outer support shaft out of the introduction slot which swings the locking element. Preferably, however, an unlocking handle cooperates with the locking element. The handle is actuated and then the outer support shaft is pulled out of the outer support bracket. This permits swinging of the sun visor toward the side window.

In several embodiments of the outer support bracket of the invention, the unlocking handle can be made in one piece with the locking element. In one embodiment that handle extends in the locking position in the manner of a push button out of the mounting member or the arm of that member. The locking element can be held at least in the locking position by means of a detent. Detent projections which cooperate with each other and hold the locking element in the locking and the unlocking positions can be arranged on the locking element and on the mounting member or the arm. The detent projections may comprise a detent tongue arranged on the side of the handle directed into the mounting member and a detent pin arranged in the mounting member.

In another embodiment, the detent projections may comprise angularly abutting flats which meet at an angle on the edge of the locking element and a cam comprising a straight mating surface or a mating surface which projects in a cam-like manner on the mounting member, with which one or the other of the flats engages, or vice versa. The elastic yieldability of the flats can be increased by the provision of a space which is free of material in the region behind the flats in the locking element.

In another embodiment of the invention, the unlocking handle can be arranged swingably on the mounting member or the arm of the member, can extend like a push-button out of the mounting member or the arm in the locking position and can have locking projections which cooperate with detent projections on the locking element. Then the unlocking handle can rest swingably with one side of the handle on an abutment which is spaced from the swivel axis and can engage via an elastic intermediate member into a recess in the locking element such that the flanks of the recess form the detent projections, and spaced projections on the intermediate member form the locking projections.

In a variant of this embodiment, between the unlocking handle and the locking element, there is a spring element which acts in the direction opposite that of rotation. The locking element has a detent projection which engages into a recess in the unlocking handle and which rests, in the locking position, on a projection on the unlocking handle. That projection is adjacent to a flank of the recess. In the unlocking position, the projection engages into the recess and rests against the opposite flank.

In a further embodiment of the outer support bracket of the invention, the locking element can be coupled for movement with a slide piece which is arranged displaceably in the mounting member. The unlocking handle can act on the slide piece. The coupling of movement can be effected by a toothed segment on the locking element and a rack element on the slide piece which cooperates with the toothed segment. The slide piece can be urged by a spring in the direction of the unlocking position. This can preferably be accomplished by the unlocking handle protruding, in the manner of a push button, out of the mounting member and engaging through a detent projection into a detent recess in the slide piece. The slide piece grips over a bearing block for the locking element. The unlocking handle is guided in an oblique guide on the bearing block and has lateral detent projections which cooperate with detent recesses on the slide piece. A compression spring is arranged between the slide piece and the unlocking handle.

In order to close the gap between the unlocking handle and the surface of the body of the car, an elastically deformable tongue can be provided on the unlocking handle, and a free end of the tongue engages into a recess in the surface of the body of the car.

Other objects and features of the invention are explained in detail below with reference to several embodiments shown in the drawings, in which:

DETAILED DESCRIPTION OF THE PREFERRED EMBODIMENTS

Figure 1:
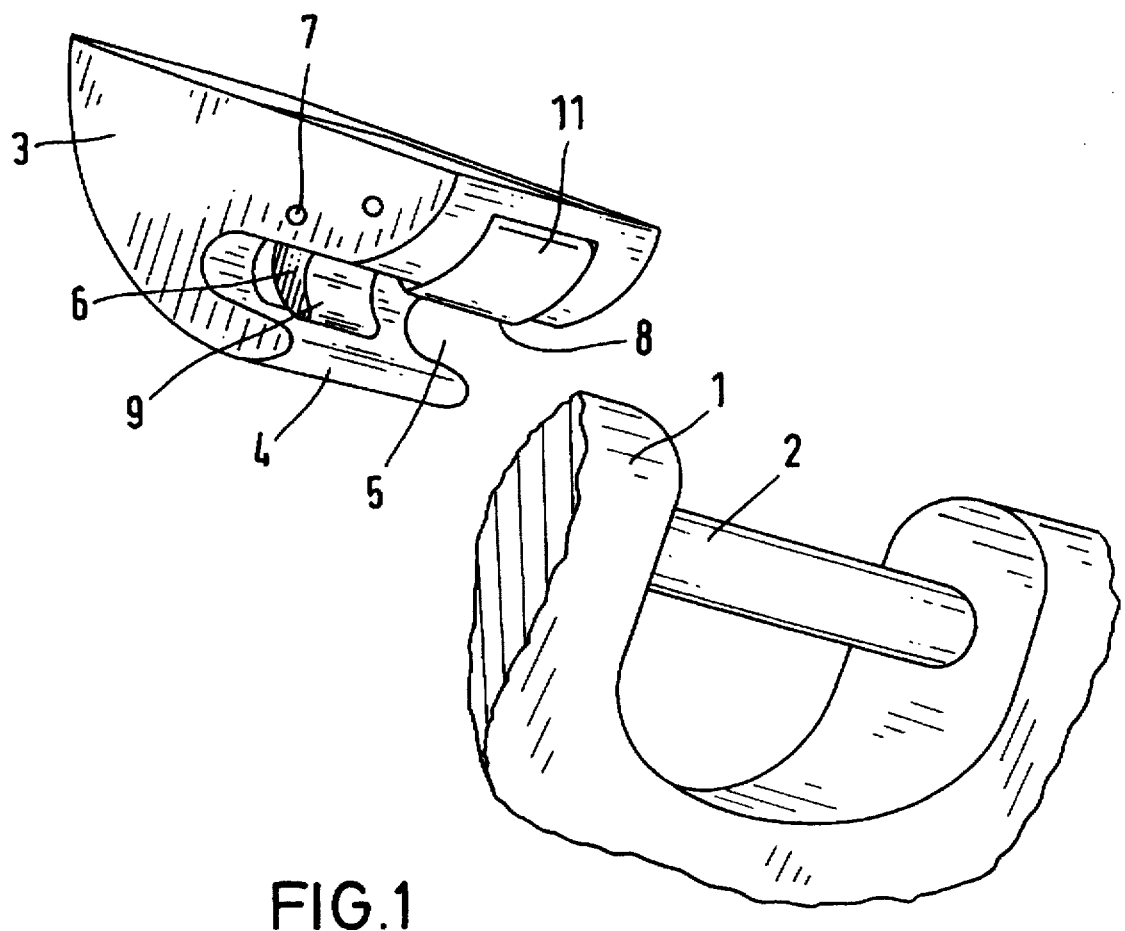
FIG. 1 is a perspective view of the outer support bracket of the invention and of a region of a sun visor with an outer support shaft.

In FIG. 1, part 1 of a vehicle sun visor having an outer support shaft 2 is shown. The outer support shaft 2 cooperates with an outer support bracket shown in FIG. 1 and in the other drawing Figures.

Figure 2:
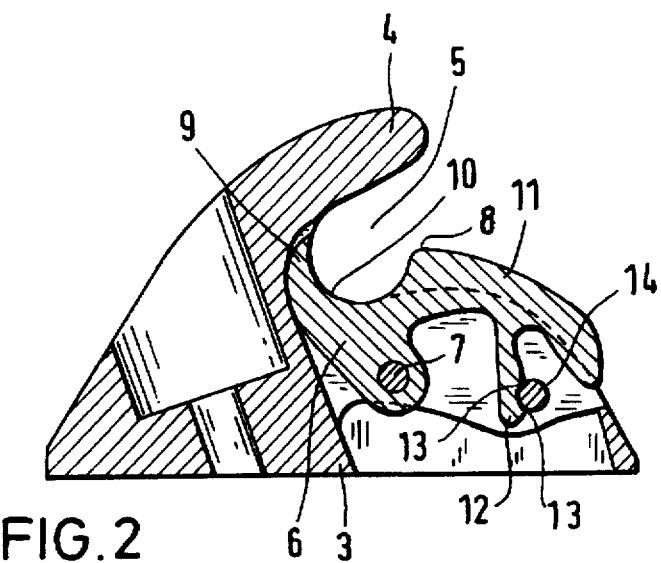
FIG. 2 is a section through the outer support bracket along the line II—II of FIG. 3 in the locking position.
Figure 3:
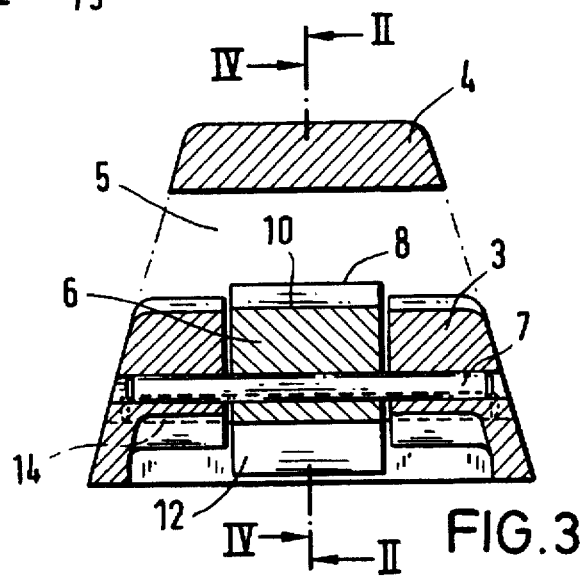
FIG. 3 is a section through the outer support bracket along the line III—III of FIG. 4.
Figure 4:
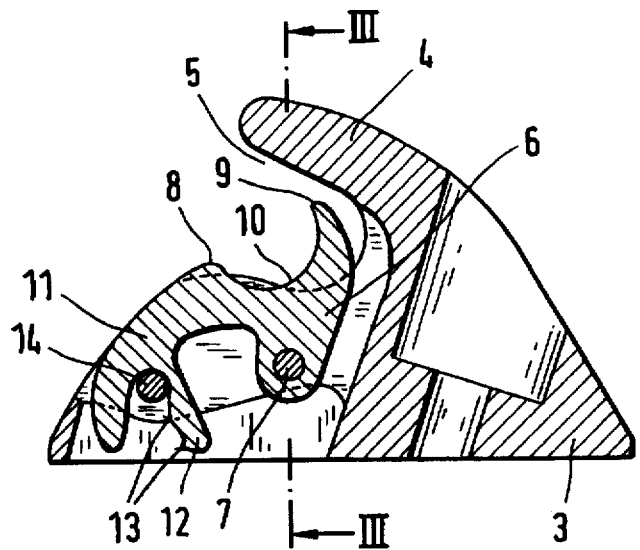
FIG. 4 is a section through the outer support bracket along the line IV—IV of FIG. 3 in the unlocked position.

In FIGS. 2–4, the bracket which includes a mounting member 3 which can be fastened to a surface of the body of the car above a window. The mounting member includes an arm 4 which defines an introduction slot 5 in the mounting member. A locking element 6 for locking the outer support shaft 2 to the mounting member is mounted in the mounting member 3. The locking element is swingable around a swivel shaft 7, for instance a pin, supported in the body of the member 3. The locking element 6 includes a recess 10 in the element for receiving the shaft 2. That recess is defined by a locking projection 8 at the entrance side of the recess and includes a locking stop 9 on the rear side of that recess. The wall of the recess is curved to the shape of the shaft 2.

An unlocking handle 11 is formed in one piece with the locking element 6. In the locking position shown in FIG. 2, the handle extends like a push button out of the mounting member 3. A detent tongue 12 is developed on the unlocking handle 11 and rests resiliently against a pin 14 which is either inserted through the mounting member 3 or is developed integrally with it. Detent projections 13 on one side surface of the detent tongue 12 cooperate with the pin 14 to determine the outer support shaft locking position shown in FIG. 2 and the unlocking position shown in FIG. 4.

In the locking position in FIG. 2, the outer support shaft 2 is held in the recess 10 by the locking projection 8 on the entrance side of the locking element 6. The shaft 2 can be pulled out of the introduction slot 5 only when the unlocking handle 11 is pressed in and down into the position shown in FIG. 4. This lowers the locking projection 8 so that it no longer blocks the introduction slot 5. The outer support shaft 2 can now be easily pulled out of the introduction slot 5 so that, for example, the sun visor can then be easily swung toward the side window.

When the outer support shaft 2 is to be again engaged in the outer support bracket 3, the outer support shaft 2 is introduced into the introduction slot 5 until it rests against the locking stop 9. If a slight additional pressure is then exerted, the locking element 6 swings back into the position shown in FIG. 2 and the locking projection 8 locks the outer support shaft in the introduction slot 5.

The outer support shaft 2 is held in rattle avoiding manner in this position within the mounting member 3 and cannot loosen itself from this position. Nevertheless, swinging out of the visor is easily done, since it can be unlocked by simple finger pressure against the unlocking handle 11.

The second and third embodiments in FIGS. 5, 6 and 7, 8 differ from the first embodiment in FIGS. 1 to 4 in that the locking element and the unlocking handle are developed in two relatively movable parts.

Figure 5:
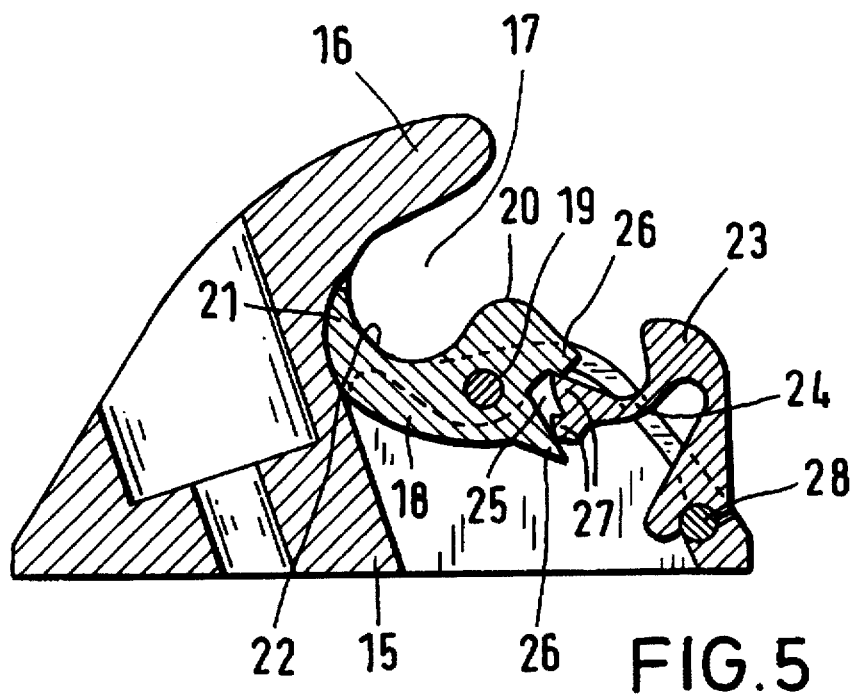
FIG. 5 is a sectional view corresponding to FIG. 2 of a second embodiment in the locking position.
Figure 6:
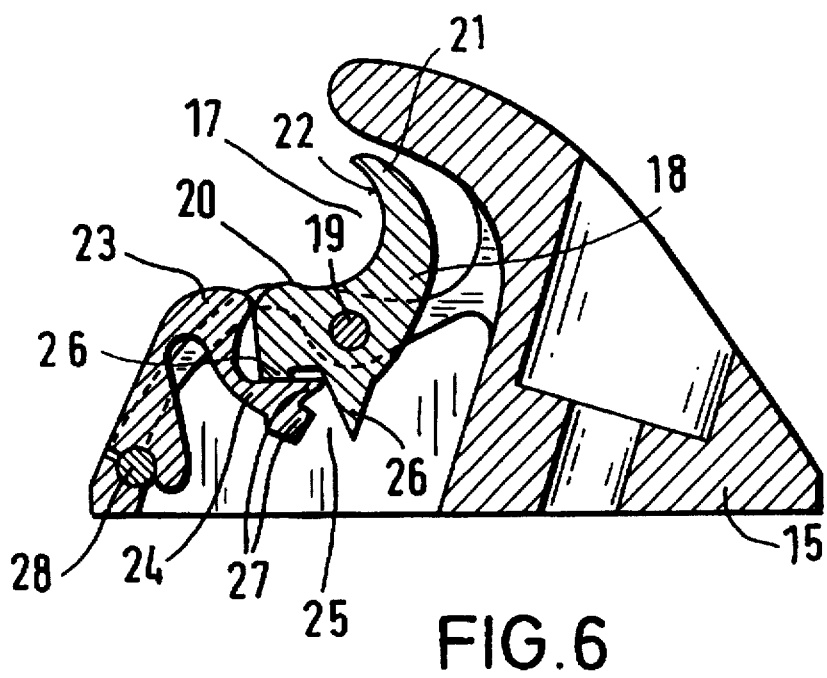
FIG. 6 is a sectional view corresponding to FIG. 4 of a second embodiment in the unlocked position.

In FIGS. 5, 6 a mounting member 15 has an arm 16 and an introduction slot 17 is defined by the arm. The locking element 18 is swingably mounted around a swivel shaft 19 supported in the member 15. The locking element 18 includes a locking projection 20 on the entrance side of the recess 22 that blocks removal of the shaft 2 from the slot 17 and a locking stop 21 at the rear of the recess that defines the rear of the slot for the shaft. These form the flanks of the recess 22 in which the shaft 2 is held.

The unlocking handle 23 has an elastic intermediate member 24 which extends, by means of transversely spaced apart locking projections 27, into a recess 25 on the locking element 18. The flanks of the recess 25 define detent projections 26 of the handle 23. One edge of the unlocking handle 23 rests against an abutment 28 on the mounting member 15. That abutment 28 is formed by an inserted pin but it may also be developed on the mounting member 15.

In the locking position shown in FIG. 5, the introduction slot 17 is narrowed by the locking projection 20, in order to hold an outer support pin of a visor, which is present in the introduction slot 17 and which rests against the locking element 18 in the recess 22. The unlocking handle 23 extends as a push-button out of the mounting member 15. Pressing one's finger on the unlocking handle 23 moves it into the position shown in FIG. 6. The locking element 18 is unlocked and swings into the position shown in FIG. 6 in which the locking projection 20 is swung downward and inward, while the locking stop 21 is swung forward in the direction for opening the introduction slot 17 to thereby push the outer support shaft forward and release it.

For introducing and locking the outer support shaft in the recess 22, it is sufficient to guide it with slight pressure into the recess 22. This causes the locking stop 21 and the entire locking element to swing and to pass into the position in FIG. 5.

Figure 7:
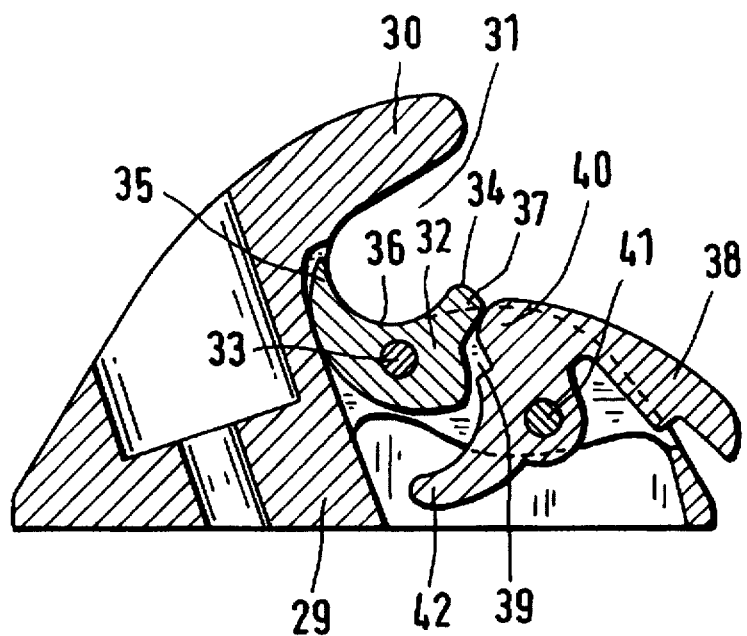
FIG. 7 is a sectional view corresponding to FIG. 2 through a third embodiment in the locking position.
Figure 8:
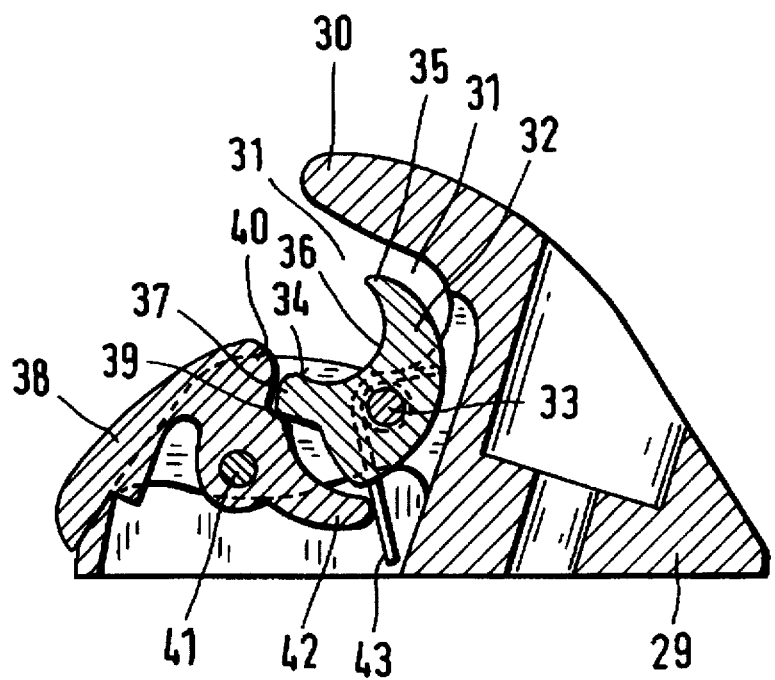
FIG. 8 is a corresponding view of a third embodiment in the unlocking position.

In the embodiment shown in FIGS. 7 and 8, the mounting member 29, together with its arm 30 and the introduction slot 31, are shaped in a manner similar to that shown in the embodiments in FIGS. 1 to 6. The locking element 32 is arranged for swinging, within the mounting member 29, around a swivel shaft 33 which is in the form of an inserted pin. The element 32 has a locking projection 34 at the entrance to the recess as well as a locking stop 35 at the rear, which are arranged on opposite sides of the recess 36. The locking projection 34 passes into a detent projection 37. In the locked position shown in FIG. 7, the projection 37 rests against a projection 40 on the unlocking handle 38. The unlocking handle 38 is mounted in the mounting member 29 by means of a swivel pin 41 and the handle extends in the manner of a push button out of the member 29. A recess 39 in the unlocking handle 38 receives the detent projection 37 in the unlocked position, which is shown in FIG. 8. A spring element 43 in the form of a leaf spring rests against an extension 42 of the unlocking handle 38. The turns of the spring are wrapped on the swivel shaft 33 while the other leg of the spring rests against the locking element 32 in such a manner that the locking element 32 and the unlocking handle 38 are turned in respective opposite directions by the spring. As a result, upon actuation of the unlocking handle 38 by pushing on it, the locking element 32 is turned suddenly into the position shown in FIG. 8 as soon as the detent projection 37 has passed the region of the recess 39 and the projection 40. In this way, the locking projection 34 moves out of the opening of the introduction slot 31 and the previously locked in outer support shaft can be removed out of the introduction slot 31.

In order to again lock the outer support shaft in the introduction slot 31, the outer support shaft is moved against the locking stop 35, and the locking element 32 is thereby moved back into the locked position shown in FIG. 7. Due to the action of the spring element 43, the unlocking handle 38 is urged to turn in the direction opposite to the locking element 32. This becomes possible when the detent projection 37 is lifted out of the recess 39 so that the projection 40 can slide below the detent projection 37 which then holds the locking element 32 again fast in the locked position.

Figure 9:
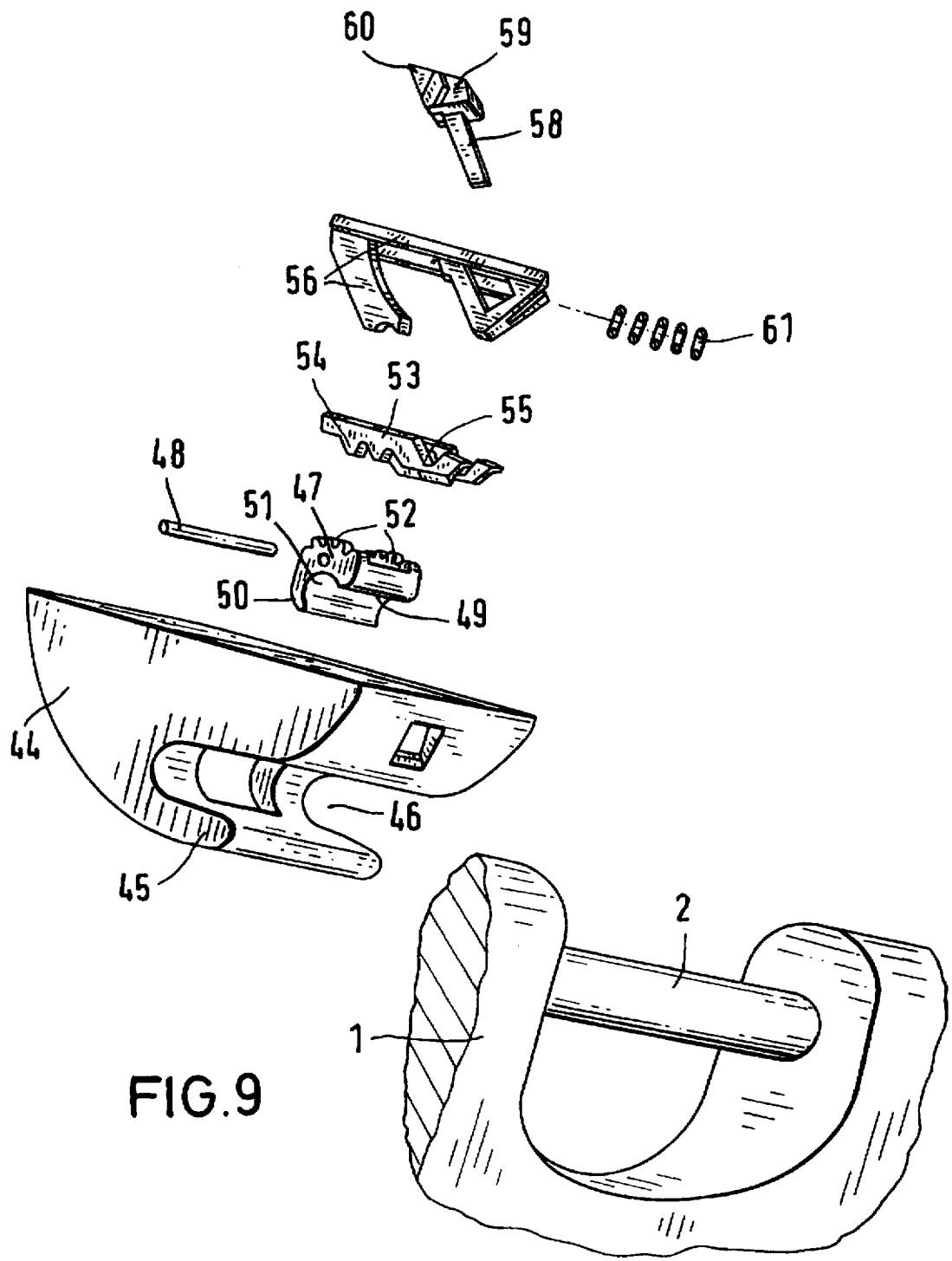
FIG. 9 is an exploded view in perspective of an outer support bracket in accordance with a fourth embodiment.
Figure 10:
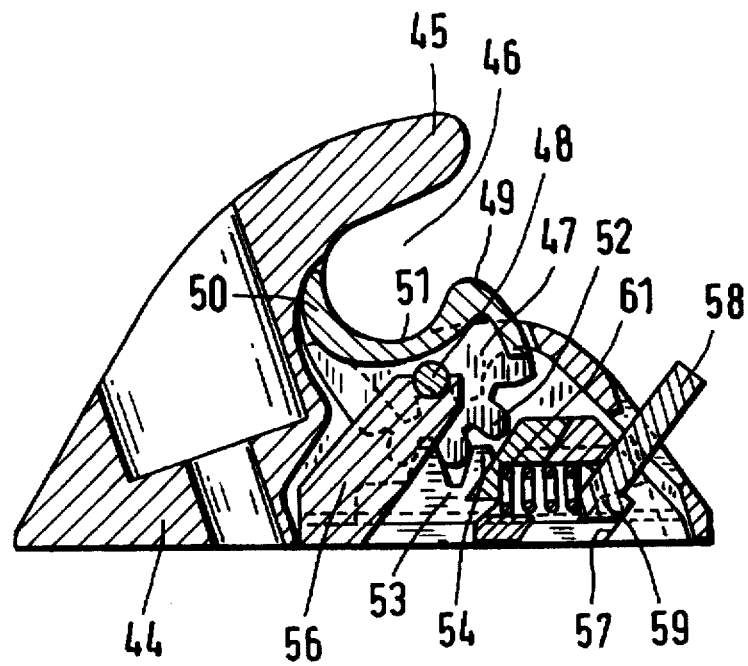
FIG. 10 is a sectional view corresponding to FIG. 2 of a fourth embodiment in the locking position.
Figure 11:
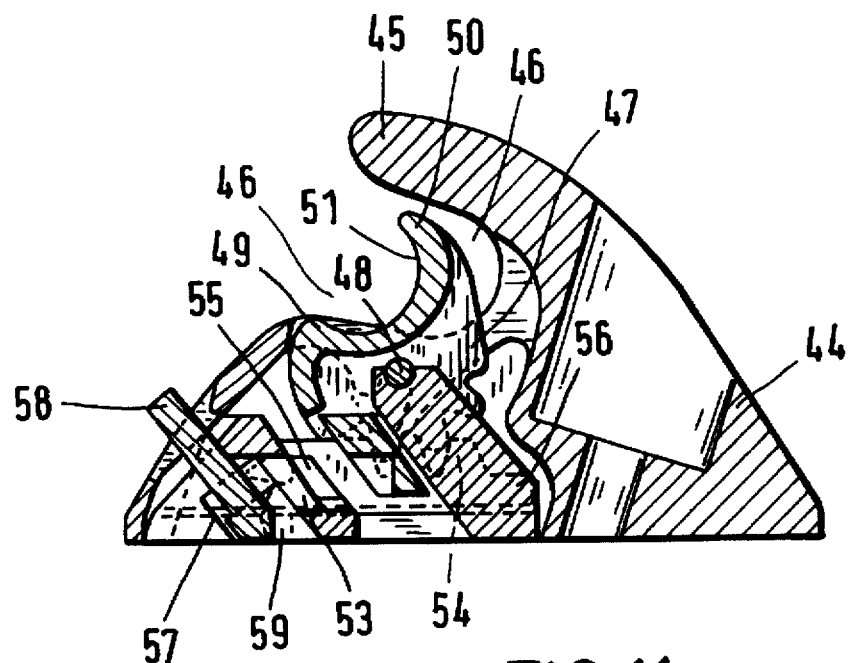
FIG. 11 is a corresponding view in the unlocking position.

In the embodiment of FIGS. 9 to 11, the mounting member 44 again has the arm 45 and the introduction slot 46. The locking element 47 is swingably mounted in the mounting member 48 on a swivel pin 48 or shaft. The pin 48 need not be a separate structural part but can also be developed on the locking element 47.

The locking element 47 has the above described locking projection 49 at its entrance side, the locking stop 50 rearward, and the recess 51 formed between them for receiving the outer support shaft. For the locking element to be swung, it is provided with a toothed segment pair 52 which engages with a corresponding rack element pair 54 on a slide piece 53. Two extensions of the rack elements 54 are provided with detent recesses 55. The slide piece 53 engages over a bearing block 56 which supports and holds the locking element 47 and acts as a guide for a block shaped slide shoe 59 disposed in an oblique guide 57. An unlocking handle in the form of a pin 58 is fastened on the slide shoe 59. The pin 58 extends out of the mounting member 44 like a push button. On the side of the slide shoe 59, there are detent projections 60 which cooperate with the detent recesses 55 on the slide piece 53. Between the slide piece 53 and the slide shoe 59, there is a compression spring 61 which is compressed to displace the slide piece 53.

As long as the slide shoe 59 is in the position shown in FIG. 10, the slide piece 53 cannot be displaced, because the detent projections 60 on the slide shoe 59 engage the detent recesses 55 in the slide piece 53. In this position, the locking projection 49 extends into the region of the introduction slot 46 and closes the entrance side of the slot so that an outer support pin located therein is held fast.

If the pin 58 is now pushed, by the pressure of a finger, downward in FIG. 10 into the mounting member 44 so that it comes into the position shown in FIG. 11, the detent projections 60 release the slide piece 53, which is then moved rearward under the action of the compression spring 61. Via the rack elements 54 and the toothed segments 52, this rotates the locking element 47 into the unlocked position shown in FIG. 11. The locking projection 49 is moved out of the region of the introduction slot 46 and the outer support shaft can be moved out of the introduction slot 46.

To again lock the outer support shaft in the introduction slot 46, it is pressed against the rear locking stop 50, which turns the locking element 47. Through the toothed segments 52 and the cooperating rack elements 54, this carries the slide piece 53 along, and the detent projections 60 again pass into the region of the detent recesses 55. The slide shoe 59 is displaced in the oblique guide 57 by the compression spring 61 to return into the position shown in FIG. 10, which again locks the slide piece 53.

All parts of the outer support bracket of the invention may be made of plastic, with the exception of the springs 43 and 61. The pins 7, 14, 19, 28, 33, 41, 48 can also be developed on the mounting member 3, 15, 29, 44, the locking element 6, 18, 32, 47 and/or the unlocking handle 28, 38, particularly when the mounting member 3, 15, 29, 44 is developed divided in a vertical plane and is bonded or welded after assembly of the individual parts.

Figure 12:
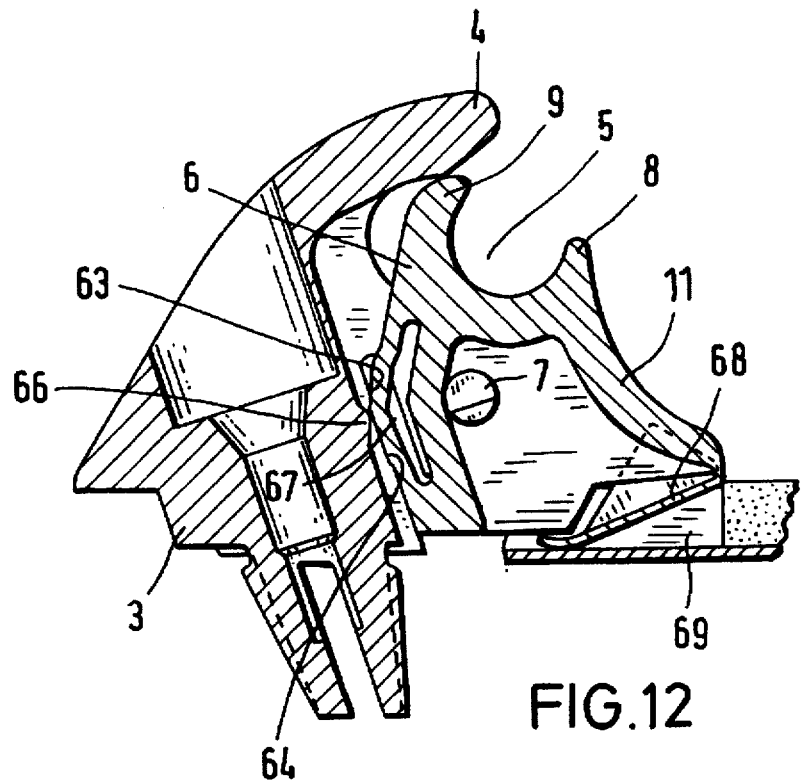
FIG. 12 is a sectional view of a further embodiment in the unlocking position.
Figure 13:
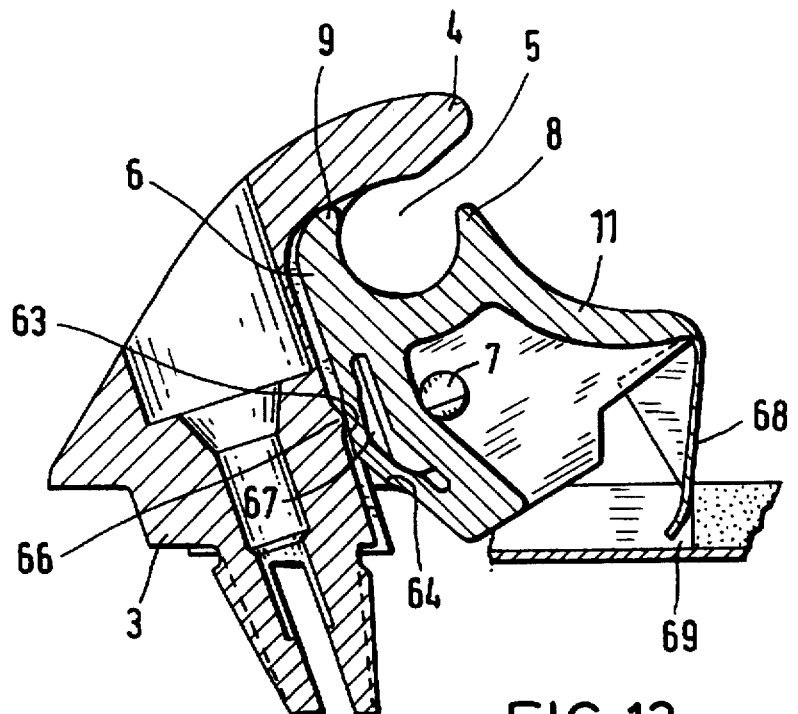
FIG. 13 is a sectional view of the outer support bracket of FIG. 12 in the locking position.

In the embodiment shown in FIGS. 12 and 13, the mounting member 3 is shaped essentially in the same manner as shown in FIGS. 2 and 4. For the engagement in the unlocking position shown in FIG. 12 and in the locking position shown in FIG. 13, the locking element 6 has flats 63, 64 on its rear edge which meet at an obtuse angle so that one or the other of the flats cooperates with a mating surface 66 which protrudes as a cam on the mounting member 3. In order to increase the elastic deformability of the locking element at the flats 63, 64, a space 67 which is free of material is provided in the locking element 6 in front of the flats.

In the unlocking position shown in FIG. 12, the flat 64 lies against the mating protruding cam surface 66, holding the locking element 6 in the unlocking position shown. Conversely, in the locking position shown in FIG. 13, the flat 63 lies against the mating protruding cam surface 66 and it holds the locking element 6 firmly in the locking position. Upon transfer from the one of the locking and unlocking positions to the other position, the locking element at the flats 63, 64 is elastically deformed and the body of the locking element collapses elastically into the material free space 67 until the corresponding end rotative position of the body 6 has been reached. In each end position, the flats again assume the position shown to lock the position of the locking element. An elastically deformable tongue 68 is attached to the unlocking handle 11 by means of a film hinge and extends into a recess 69 in the surface of the body of the car. In this way, the gap between the surface of the body of the car and the unlocking handle 11 is concealed in the locking position in the manner shown in FIG. 13.

Figure 14:
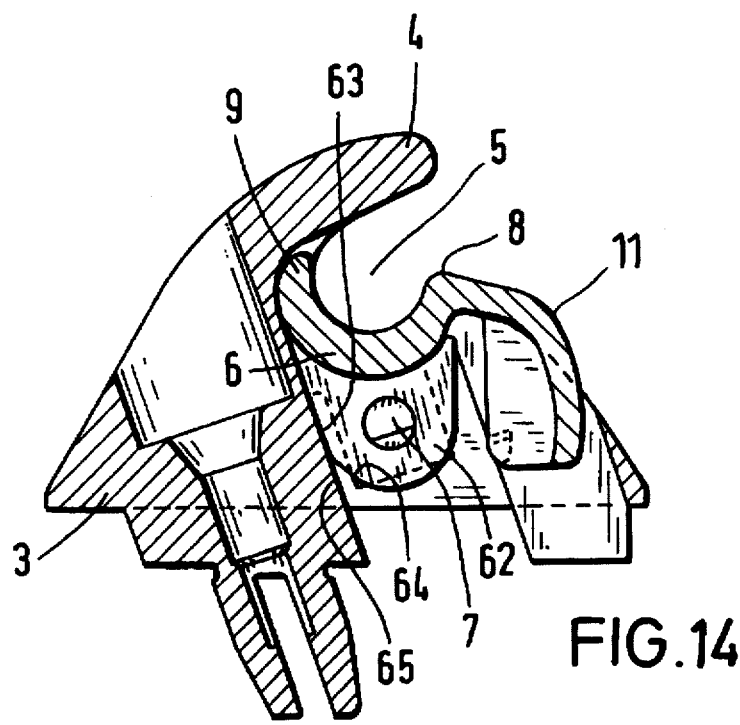
FIG. 14 is a sectional view of another embodiment of the outer support bracket of the invention in the locking position.
Figure 15:
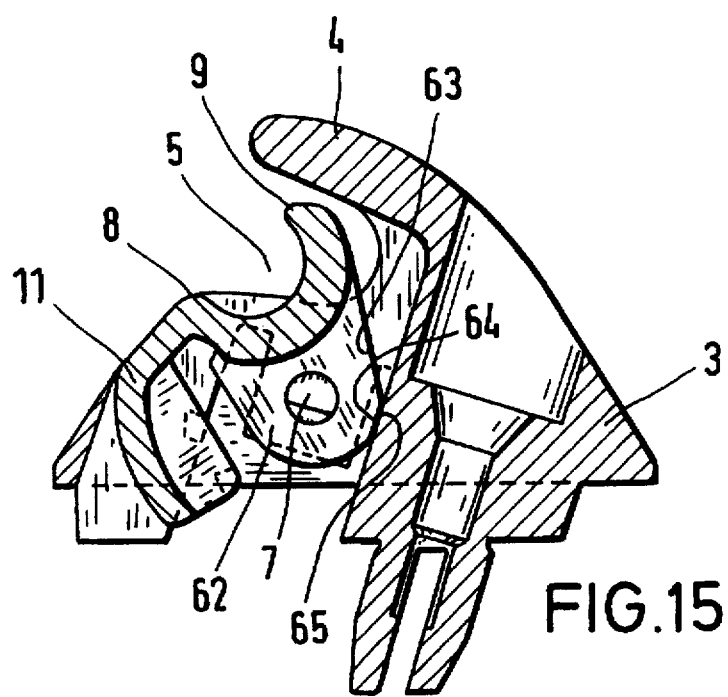
FIG. 15 is a sectional view of the outer support bracket of FIG. 14 in the unlocking position.

The embodiment of FIGS. 14 and 15 differs from that of FIGS. 12 and 13 in that the locking element 6 has a mounting projection 62 for the swivel shaft 7. This mounting projection 62 also has flats 63, 64 on its rear surface which meet at an obtuse angle and separately cooperate with a straight mating surface 65 on the mounting member 3. The action is fundamentally the same in this embodiment as in the embodiment of FIGS. 12 and 13. But in this case, the locking and unlocking are based on the elastic deformability of the mounting member 3, of the locking element 6 and of the swivel shaft 7, presenting increased demands on the precision of manufacture.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An outer support bracket for an outer support shaft of a vehicle sun visor, the bracket comprising:

a mounting member fastenable to a surface of a body of a vehicle, the mounting member including an arm which projects out of the mounting member for defining one side of an introduction slot for receiving the shaft in the mounting member;

a locking element pivotably supported in the mounting member and pivotable between an unlocking position wherein the locking member frees the outer support shaft for introduction into and removal from the introduction slot, and a locking position wherein the locking element retains the outer support shaft in the introduction slot;

a locking projection defined in the locking element at a location which cooperates with the arm of the mounting member for defining the introduction slot for the support shaft; the locking projection being so positioned on the locking element that with the locking element in the locking position, the locking projection and the mounting member arm prevent the outer support shaft from being removed from the introduction slot and so that with the locking element in the unlocking position, the locking projection does not block the insertion of the outer support shaft into and removal of the outer support shaft from the introduction slot;

an unlocking handle connected with the locking element for being operated manually for moving the locking element between locking and unlocking positions; and detent means engageable with the locking element for holding the locking element in the locking position wherein the detent means comprises an engageable element on one of the mounting member and the locking element and a detent element on the other of the mounting member and the locking element, the detent element having two engageable locations thereon for engaging the engageable element for holding the locking element in the locking position and the unlocking position, respectively.

2. The outer support bracket of claim 1, further comprising a shaft at the mounting member on which the locking element is positioned so that the locking element swings around the shaft of the mounting member.

3. The outer bracket of claim 1, wherein the locking element has a recess therein which opens outward of the introduction slot, is generally in the introduction slot, is generally adapted in the shape of the outer support shaft and is defined at one side thereof by locking projection of the locking element.

4. The outer support bracket of claim 3, further comprising a shaft at the mounting member on which the locking element is positioned so that the locking element swings around the shaft of the mounting member and wherein the recess in the locking element opens in a direction away from the shaft for the locking element.

5. The outer support bracket of claim 3, wherein the locking element recess is defined on one side of the recess by the locking projection and on the other side of the recess by a locking stop, the locking stop being generally toward the arm of the mounting member.

6. The outer support bracket of claim 1, further comprising detent means engageable with the locking element for holding the locking element in the locking position.

7. The outer support bracket of claim 1, wherein the unlocking handle is part of the locking element and with the locking element in the locking position, the unlocking handle extends out of the mounting member to be operated.

8. The outer support bracket of claim 1, wherein the engageable element is on the mounting member and comprises a detent pin on the mounting member, and the detent element is on the locking element and comprises a detent tongue with two detent positions along it respectively for engaging the detent pin for detenting the locking element in one of the locking and unlocking positions.

9. The outer support bracket of claim 8, wherein the unlocking handle is connected with the locking element for being operated manually for moving the locking element between the positions thereof; the detent tongue being defined on the handle of the locking element at the side thereof which faces in toward the mounting member.

10. The outer support bracket of claim 1, wherein the unlocking handle is mounted to and is movable with respect to the mounting member and extends out of the mounting member.

* * * * *